UNITED STATES PATENT OFFICE.

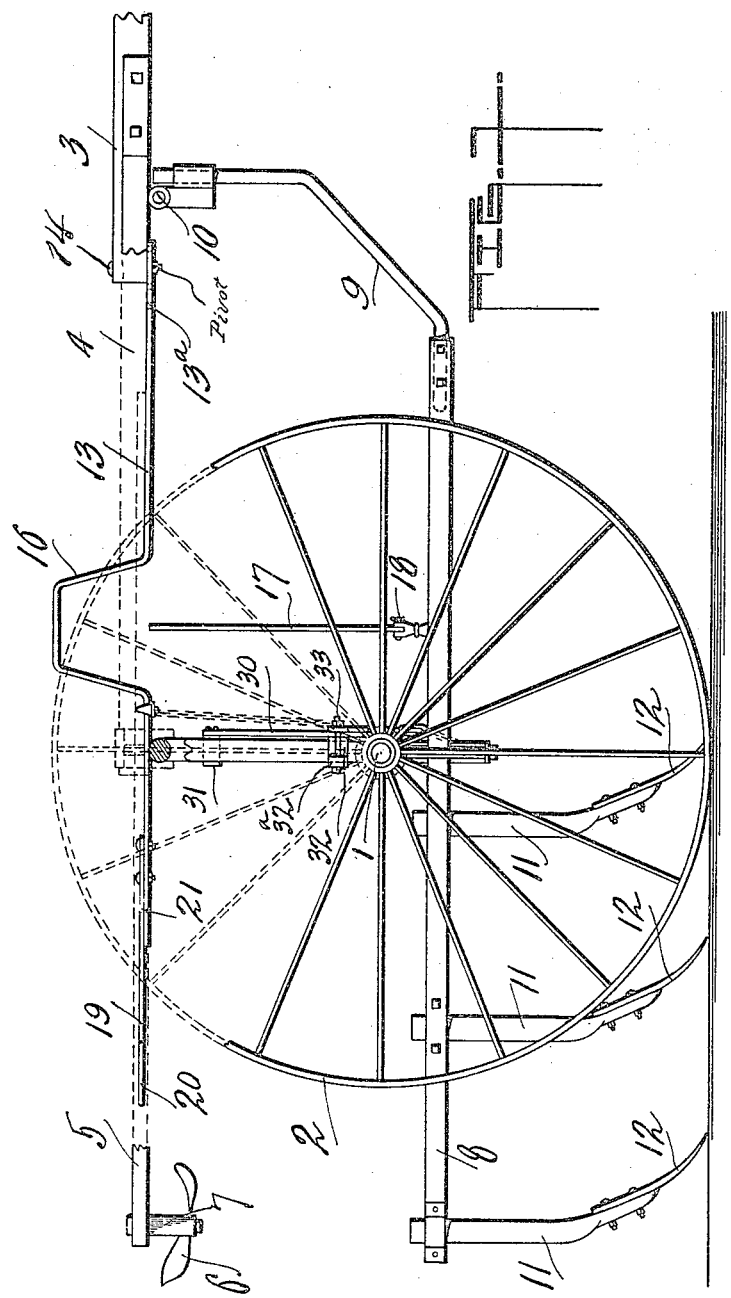

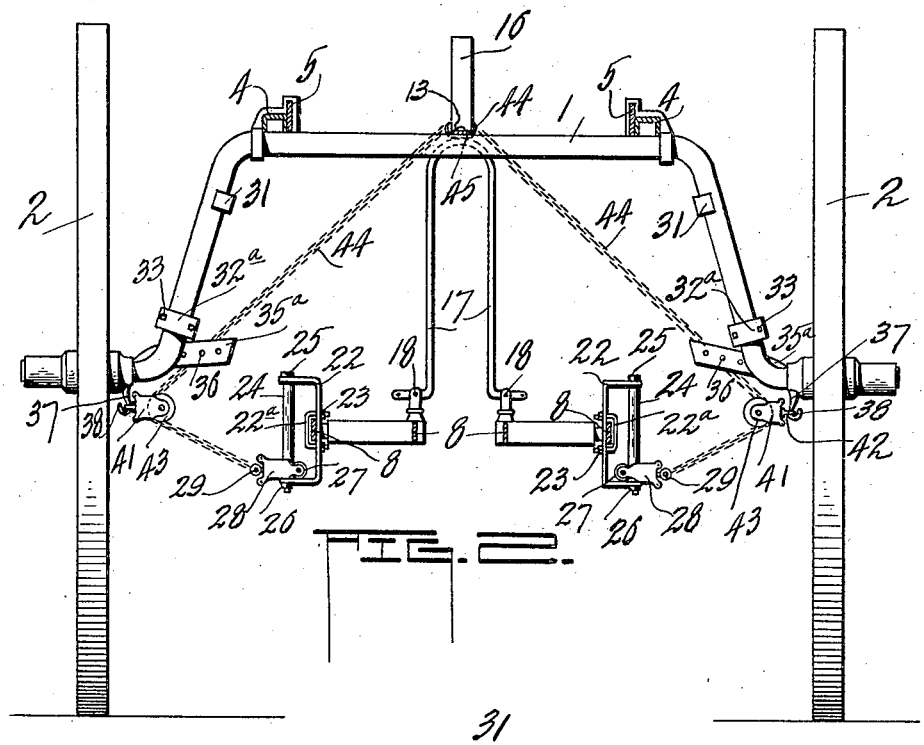

THOMAS MULALLY, OF PRINCEVILLE, ILLINOIS.

CULTIVATOR.

No. 816,351.  Specification of Letters Patent.  Patented March 27, 1906.

Application filed April 11, 1905. Serial No. 255,000.

*To all whom it may concern:*

Be it known that I, THOMAS MULALLY, a citizen of the United States, residing at Princeville, in the county of Peoria and State of Illinois, have invented certain new and useful Improvements in Cultivators; and I do hereby declare that the following is a full, clear, and exact description of the invention, which will enable others skilled in the art to which it appertains to make and use the same.

This invention has reference to new and useful improvements in cultivators, being adapted to be attached to disk, surface, or shovel cultivators. The devices in this instance are shown applied to a shovel cultivator.

The object of the invention is a guide-lever having connection with the beams or gangs carrying the shovels and the hand-hold of the lever within reach of an operator that he may through the connection of the same with the gangs control the several beams with one motion.

This application sets forth improvements upon the devices shown, described, and claimed in a patent issued to me on February 7, 1905, No. 781,841, relating particularly to the lever and the supports for the sheave-wheels or guides around which chains are carried intermediate the lever and the gangs.

A further object of the invention is a guide-lever adapted to its forward end to have an adjustable pivotal connection with a suitable support, supports adapted to have an adjustable connection with the vertical portions of the arched axle, a bracket-arm laterally adjustable on the said axle-supports and adapted to have detachably connected therewith suitable sheave or guiding wheels, and chains having one end suitably attached to the lever and passing over the sheave-wheels aforesaid have their opposite ends connected in a suitable manner to the shovel-beams, whereby as the lever is operated the shovels and their beams will be correspondingly shifted.

The invention has for its further object details of construction to be hereinafter more fully described in the specification, pointed out in the appended claims, and illustrated in the accompanying drawings, forming a part of this specification, in which —

Figure 1 is a side elevation, with parts broken away and in section, of so much of a well-known form of cultivator as to illustrate my improvements attached thereto. Fig. 2 is a rear elevation, parts in section, of the cultivator shown in Fig. 1 and illustrates a rear elevation of the guiding-lever and adjustable connections between the shovel-beams and said lever. Fig. 3 is a detail in perspective of the adjustable supports attached to the axle, also the bracket-arm supported thereby.

In the drawings, 1 denotes the ordinary arched axle used in practically all riding-cultivators, on the opposite terminals of which are carried the ground-wheels 2.

3 denotes a pole, to which are attached suitable swingle and double trees, and 4 denotes straps which are secured at their forward ends to the poles and at their inner ends fixedly attached to the arch of the axle 1, and 5 denotes additional frame parts which extend across the arch of the axle and have their forward ends secured to the straps 4, while their rear ends support a driver's seat 6, attached to a spring-strap 7, the ends of which are secured to the rear ends of the frame parts 5.

8 denotes shovel-beams which at their forward ends are attached to the rods 9, which have a swingable connection with a transverse rod 10, suitably supported under the pole. The beams 8 are of the usual construction and support the shanks 11, which at their lower ends carry the shovels 12.

In the drawings I have shown the necessary frame parts and outline of a cultivator, that the application of the present improvements may be more readily understood. However, it is understood that no special claim is made upon any of the parts of the cultivator, such as the frame, beams, or shovels, but to the attachments for controlling the said beams and shovels. Therefore it has not been thought necessary to show the means of raising and lowering the beams, nor other well-known details which form a part of most every riding-cultivator, the stirrups particularly being omitted, as the devices of this improvement are intended to supplant the same.

13 refers to a longitudinally-disposed lever pivoted at its forward end at 14 to the pole 3. For purposes soon to become apparent the front end of the lever is provided with a series of perforations $13^a$ to adapt the lever to have an adjustable connection with the pole at 14. The lever is of suitable length and extends rearwardly and across the arch of the axle 1. The body of the lever 13 is provided with an upwardly-extended yoke or arched body, as at 16. In the present device the arch 16 is disposed in advance of the arch of the axle 1. However, it may be deemed necessary in other forms of cultivators to place the arch 16 of the lever to the rear of the axle. The occasion for the arch 16 in the lever is to provide for the raising of a yoke 17, which connects the shovel-beams 8. This yoke 17 is pivotally connected at 18 to the beams 8 and while preventing the undue spreading of the said beams retains them in their relative positions when shifting and adapts the machine to the cultivation of rows of corn when grown to considerable size. So in the use of my attachment and its lever 13 to this form of cultivator I must provide for the raising of the yoke 17 without disturbing the said lever, which could not be attained unless the lever is arched in the manner indicated. In connection with the arch in the lever and the yoke 17 it is found necessary at times to adjust its pivot or fulcrum point 14 to bring the arch 16 above the yoke 17; hence the series of perforations 13$^a$ in the forward end of the lever. The rear end of the lever has adjustably connected therewith a lever extension 19, which is provided with a handhold 20 within easy reach of the driver on the seat 6. The rear end of the lever proper and the extension 19 are each provided with a series of perforations 21 to facilitate in lengthening or shortening the same to give more or less leverage.

At a suitable point on the beams 8, as in the patent referred to, is secured a suitable strap 22, which is attached to the beams by means of the U-shaped rods 22, which surround the beams 8 in manner seen in Fig. 2 and retained in place by the nuts 23. The said straps support the elongated sleeves 24, which are secured in position on the straps by means of rods 25 and the nuts 26, the rods being passed through the ends of the straps and the sleeves and having the nuts secured on the lower ends thereof. Sliding up and down and having engagement with the sleeves 24 are sheave-wheels 27, which are carried by castings 28, and having a swivel connection with said castings are eyebolts 29. The uses of the castings, together with the eyebolts and sheave-wheels, will be further described in connection with the improvements herein.

Upon each of the vertically-extended portions of the axle 1 is adapted to be adjustably secured the bars 30, which are suitable supports. These bars are of suitable length, parallel the axles where they connect for a suitable distance, and retained at their upper ends by means of lips 31, which partially encircle the said axle, while at their lower ends the bars 30 are secured to a clamp consisting of the half-boxings 32 32$^a$, secured on the axle by the bolts 33, which also secure the plates 34 through the medium of the nuts 35, the bar 30 passing between the plate 34 and the section 32 of the boxing. To the lower ends of the bars 30 are adjustably secured the bracket-arms 35$^a$, these arms being provided with a series of perforations 36, by means of which the lateral position of the arms 35$^a$ may be changed—that is, their ends or lower depending portions 37, which have hooks 38, may be positioned closer to or farther from the wheels 2, a bolt 39 serving to secure the bracket-arms 35$^a$ to the bar 30, while an offset or clip 40 prevents the arm 35$^a$ swinging on the bolt 39.

Through the sections of the boxings 32 and 32$^a$ it will be seen that the bar 30 may be raised or lowered on the axles and so retained, also that the perforations 36 in and the length of the bracket-arm 35$^a$ will adapt the changing of the position of the hooked ends 38 of the said bracket-arms, all of which will accommodate these last-mentioned devices to varying heights and widths of the frames of cultivators.

To the hooked ends 38 of the bracket-arms 35$^a$ are connected castings 41 by means of eyebolts 42, swiveled to the said castings, the latter supporting the sheave-wheels 43, as shown.

44 indicate chains which at one end are secured to the eyebolts 29 of the castings 28 and passing up and around the sheave-wheels 43 of the castings 41 are attached to the opposite hooks 44 of a plate 45, secured at a suitable point to the main body of the lever 13.

From the drawings it will be seen that castings 41 through their eyebolts 42 have a swinging connection with the hooked ends of the bracket-arms 35$^a$; also, that the castings 28 through their sheave-wheels 27 have a vertical sliding movement on the sleeves 24, the latter adapted to raise and lower with the movement of the shovel-beams when they are depressed into the ground or raised therefrom.

The use of the guiding-lever and its connection with the shovel-beams produces a result in a riding-cultivator not heretofore attained. It does away with all footwork on the part of the driver for guiding the shovel-beams and is yet so convenient that the driver can handle the lines in one hand and operate the lever with the other and may assist himself in the use of stirrups, if necessary, and it will thus be seen that through the connections described and the arrangement both of the beams are controlled with one motion of the lever.

The supports for the guide-wheels 43, which consist, essentially, of the boxings 32 and 32$^a$, also the bar 30 and the arms 35$^a$ in addition to the vertical adjustment of the bar 30 and the lateral adjustment of the arms 35$^a$, are revolubly adjustable on the axle through the adjustment of the boxings which support the same to allow the chain 44 to work free in the event the direction in which the chain is carried should ever cause it to engage with the rear of the arms 35ª.

A further advantage of the improvement herein is in the use of a cultivator on the side of a hill. It is a well-known fact that the cultivator will naturally run downhill, and it is practically impossible to hold the beams to their work by the use of the feet, as one side must be depressed and the other lifted. This has been entirely overcome by the use of the lever herein shown and the connection with the shovel-beams, as the shovels may be retained in any adjusted position whether upon level or hilly ground.

It is obvious from the foregoing that changes may be made and the application of the device modified to adapt it to various styles and forms of cultivators, and I do not wish to be confined to the exact details herein.

What I claim is—

1. In a cultivator, the combination with the shovel-beams, of a lever adjustably and pivotally connected at its front end, chains connected with the beams and the lever, adjustably-mounted supports, and guide-wheels suitably attached to said supports, around which the said chains are carried.

2. In a cultivator, the combination with the shovel-beams, of a lever pivoted to have horizontal movement on said cultivator, chains connected to the beams and the lever, adjustably-mounted supports, and guide-wheels suitably attached to said supports, around which the said chains are carried.

3. In a cultivator, the combination therewith of a lever pivoted at its front end to a support of the cultivator, chains connected with the body of the lever and with devices slidably connected with the shovel-beams, bracket-arms having a laterally-adjustable connection with the arched axle of the cultivator, and sheave-wheels supported by the bracket-arms around which the said chains are carried.

4. In a cultivator, the combination with the shovel-beams and axle thereof, of supports attached to said axle, bracket-arms adjustably attached to said supports, guide-wheels connected with the said arms, chains connected with the beams and passing over the guide-wheels, and means to which the free ends of the chains are attached for controlling the said beams.

5. In a cultivator, the combination with the shovel-beams and axle thereof, of supports vertically adjustable on the axle, bracket-arms laterally adjustable on the said supports, guide-wheels attached to said arms, a lever, and flexible connections between the lever and said beams, the connections passing around the guide-wheels aforesaid.

6. In a cultivator, the combination with the shovel-beams and axle thereof, of supports sustained in a suitable manner by the axle, bracket-arms provided with hooked ends, and adjustably connected to the said supports; a guide-wheel connected to the hooked ends of the arms, a sheave-wheel slidably attached to the beams, a lever, and chains connecting the sheave-wheels of the beams with the lever and passing over the guide-wheels aforesaid.

7. In a cultivator, the combination with the shovel-beams and axle, a yoke connecting the said beams, a lever fulcrumed in advance of the axle and the body thereof horizontally swingable across the same, an arch formed in the body of the lever above the yoke aforesaid, chains connected at one end to the lever and having connection at their opposite ends with the beams, guides for the said chains, and supports for the guides being adjustably connected to the axle.

8. In a cultivator, the combination with the shovel-beams and axle, a yoke connecting the said beams, a lever pivoted in an adjustable manner in advance of the axle, an arch in the body of the lever above the yoke aforesaid, chains connected at one end to the lever and having connection at their opposite ends with the beams, guides for the chains intermediate their connections, and a vertically and laterally adjustable support for the said guides.

9. In a cultivator, the combination with the shovel-beams and axle, a yoke connecting the said beams, a lever pivoted in an adjustable manner in advance of the axle, an arch in the body of the lever above the yoke aforesaid, chains connected at one end to the lever and having connection at their opposite ends with means having a vertically-slidable connection with the beams, guides for the chains intermediate their ends, and a vertically and laterally adjustable support for the said guides.

10. In a cultivator, the combination with the shovel-beams and axle thereof, of supports swingably and vertically adjustable on the axle, bracket-arms laterally adjustable on said supports, guide-wheels carried by said arms, a lever, and connections between the lever and said beams, said connections passing around the guide-wheels aforesaid.

In testimony whereof I affix my signature in presence of two witnesses.

THOMAS MULALLY.

Witnesses:
ROBT. N. MCCORMICK,
CHAS. W. LA PORTE.